United States Patent [19]

Iwata et al.

[11] 4,328,855

[45] May 11, 1982

[54] METHOD AND APPARATUS FOR CONTROLLING AUTOMOBILE AIR CONDITIONERS

[75] Inventors: Yasuhiro Iwata, Aichi; Kiyoshi Usami, Obu; Masanori Naganoma, Kariya; Teiichi Nabeta, Okazaki; Yasuhumi Kojima, Gifu, all of Japan

[73] Assignee: Nippondenso Co., Ltd., Kariya, Japan

[21] Appl. No.: 85,510

[22] Filed: Oct. 17, 1979

[30] Foreign Application Priority Data

Oct. 20, 1978 [JP] Japan ................................ 53/129657

[51] Int. Cl.³ .................. F25B 13/00; B60H 3/00
[52] U.S. Cl. .................................. 165/2; 165/12; 165/30; 165/43; 236/84
[58] Field of Search ............... 237/12.3 A; 236/82, 236/84; 165/12, 23, 27, 28, 30, 42, 43, 44, 2

[56] References Cited

U.S. PATENT DOCUMENTS

| | | | |
|---|---|---|---|
| 3,315,730 | 4/1967 | Weaver et al. | 165/23 |
| 3,731,729 | 5/1973 | Beatenbough et al. | 165/42 |
| 4,037,651 | 7/1977 | Ito et al. | 165/30 |
| 4,147,205 | 4/1979 | Bata et al. | 165/26 |
| 4,206,872 | 6/1980 | Levine | 165/12 |

Primary Examiner—Samuel Scott
Assistant Examiner—Margaret A. Focarino
Attorney, Agent, or Firm—Cushman, Darby & Cushman

[57] ABSTRACT

A method and apparatus for controlling an automobile air conditioner wherein a deviation between the actual in-car temperature and a desired in-car temperature is periodically calculated to detect such various thermal disturbances as changes of the solar heat, the temperature of outside air, the number of passengers and the like, and wherein a compensation value of the opening angle of the air-blend door is determined in accordance with the periodical variation of the deviation to ensure stable control of the in-car temperature.

6 Claims, 6 Drawing Figures

METHOD AND APPARATUS FOR CONTROLLING AUTOMOBILE AIR CONDITIONERS

BACKGROUND OF THE INVENTION

The present invention relates to automobile air conditioners, and more particularly to a method and apparatus for controlling an automobile air conditioner of the type in which a control member is provided to adjust the output of the air conditioner from maximum heating to maximum cooling according to its position.

In a conventional automobile air conditioner of this kind, all the air entering into the air duct passes through the air conditioner evaporator and then passes through the heater core before it is discharged into the passenger compartment. The proportion of the cooled air and the heated air is controlled in response to an instant opening angle of the air-blend door, and the heated air is mixed with the remainder of the cooled air to achieve a comfortable temperature. To maintain the comfortable temperature under the control of the air-blend door, it is required to compensate the opening angle of the air-blend door in accordance with such various thermal disturbances as changes of the solar heat, the temperature of outside air, the number of passengers, the travelling speed of the vehicle and the like. For this requirement, various sensors are needed to detect the thermal disturbances, and the application of the various sensors will cause the control system to amount to a complicated construction.

SUMMARY OF THE INVENTION

It is, therefore, a primary object of the present invention to provide a method and apparatus for an automobile air conditioner wherein a deviation between the actual in-car temperature and a desired in-car temperature is periodically calculated to detect a tendency of variation of the deviations, and wherein a compensation value of the opening angle of the control member is determined in dependence upon the tendency of variation of the deviation to ensure stable control of the in-car temperature.

According to the present invention briefly summarized, there is provided an electric control system for an automobile air conditioner in which a control member is provided to adjust the output of the air conditioner from maximum heating to maximum cooling according to its position, which control system comprises an in-car sensor exposed to the temperature in a passenger compartment for generating a first electric signal indicative of the actual in-car temperature, a temperature selector for generating a second electric signal indicative of a desired in-car temperature, a position sensor responsive to movement of the control member for generating an electric feedback signal indicative of the position of the control member, first means responsive to the first and second electric signals for calculating a deviation between the actual in-car temperature and the desired in-car temperature at a predetermined time interval and for discriminating the calculated deviation in relation and for periodically discriminating the previously calculated deviation in relation to the subsequently calculated deviation to detect a tendency of variation of the deviations, the first means determining a compensation value related to the calculated deviation in dependence upon the discrimination result of the deviations, second means for discriminating a value of the feedback signal in relation to the compensation value to generate an output signal in accordance with the compensation value taking into account the feedback signal value, and an actuator for controlling the position of the control member in response to the output signal from the second means.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
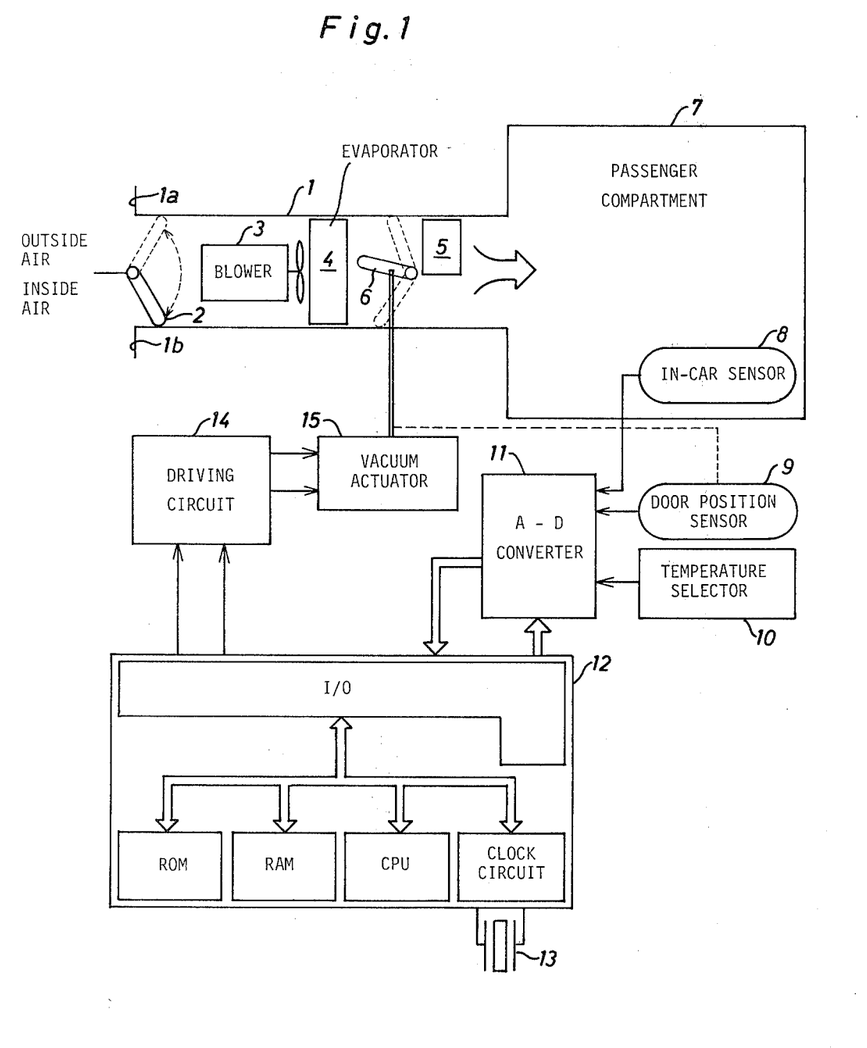
FIG. 1 is a schematic block diagram of an electric control system for an automobile air conditioner according to the present invention.

Referring now to the drawings, in particular to FIG. 1 there is illustrated a schematic block diagram of an electronic control system for an automobile air conditioner according to the present invention, in which a microcomputer 12 is employed to execute the required digital calculations on the basis of a predetermined control program. The air conditioner includes an air duct 1 allowing the flow of air to be conditioned, which air duct 1 is provided with a first inlet 1a for induction of outside air from the exterior and with a second inlet 1b for recirculation of inside air from the passenger compartment. A switch door 2 is provided to switch over the induction of outside air to and from the recirculation of inside air. When positioned as shown by a solid line in the figure, the switch door 2 allows the induction of outside air and closes off the entry of inside air. A variable speed blower 3 is arranged within the air duct 1 to draw the air from the first inlet 1a and/or the second inlet 1b, and the drawn air is cooled by an evaporator 4. A heater core 5 is arranged downstream of the evaporator 4 to warm the cooled air under the control of an air-blend door 6, the added heat being controlled by varying the engine cooling water flowing through the heater 5. The proportion of warm and cooled air is controlled in response to an instant opening angle of the air-blend door 6, and the warm air is mixed with the remainder of cooled air to achieve a comfortable temperature in the passenger compartment 7.

The electronic control system comprises an in-car sensor 8 exposed to the temperature of the passenger compartment to generate an electric signal indicative of an actual in-car temperature. The control system further comprises a door position sensor 9 and a temperature selector 10, the sensor 9 being in the form of a potentiometer responsive to movement of the air-blend door 6 to generate a feedback signal indicative of the angular position of air-blend door 6, and the temperature selector 10 being manually set in a selected position to generate an electric signal indicative of a desired in-car temperature. All the signals from sensors 8, 9 and temperature selector 10 are applied to and converted by an analog-to-digital converter 11 into electric binary signals in sequence.

The microcomputer 12 is in the form of a single chip LSI which receives a constant voltage from a voltage stabilizer for its operation. The voltage stabilizer receives an electric power supply from an automobile battery to produce the constant voltage therefrom. The computer 12 comprises a central processing unit or CPU which is connected to an input-output device or I/O through a data bus 12a. CPU is also connected through data bus 12a to a clock circuit, a read only memory or ROM and a random access memory or RAM. The clock circuit is cooperable with a crystal oscillator 13 to produce a clock signal at a predetermined frequency, and the predetermined control program is stored in ROM. I/O receives the binary signals from converter 11 to temporarily memorize them in RAM. These memorized signals are selectively read out and applied to CPU through data bus 12a. CPU serves to execute the predetermined control program in accordance with clock signals from the clock circuit. A driving circuit 14 is provided to amplify an output signal from computer 12, and a vacuum actuator 15 is linked to air-blend door 6. Thus, the vacuum actuator 15 is operated in response to the amplified signal from driving circuit 14 to control the angular position of air-blend door 6, the operation of actuator 15 depending upon the presence or absence of applied vacuum.

Figure 2:
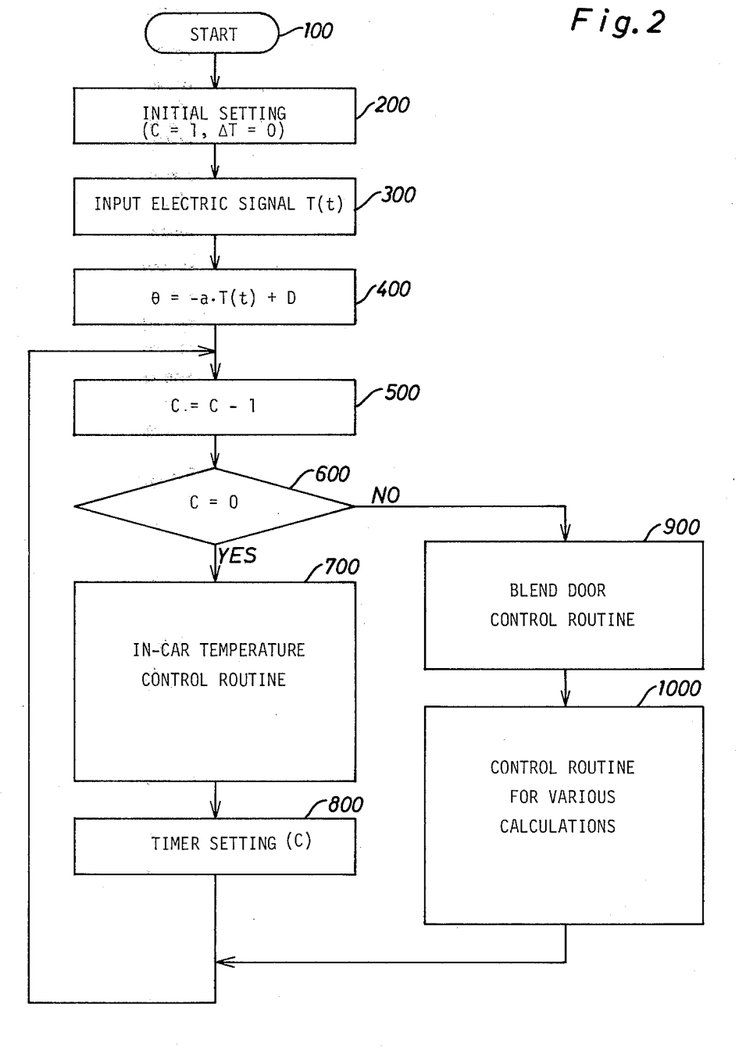
FIG. 2 is a flow diagram illustrative of the operation of a microcomputer for the electric control system.

Hereinafter, the operational mode of the above embodiment will be described in detail with reference to flow diagrams respectively shown in FIGS. 2 to 6. When a set switch (not shown) is actuated to connect the voltage stabilizer to the battery, the computer 12 is activated upon receiving the constant voltage from the stabilizer to initiate the following calculations under the predetermined control program at a start step 100, as shown in FIG. 2. Then, the initial setting of computer 12 is completed at a set step 200 where a timer data C is set as C=1 in a timer of computer 12 and an in-car temperature deviation $\Delta T$ is set as $\Delta T = 0$ in computer 12. After completion of the initial setting of computer 12, the program proceeds to an in-car temperature input step 300 where the computer 12 receives an input signal indicative of an actual in-car temperature T(t) from in-car sensor 8 through converter 11, and subsequently the program proceeds to a $\theta$-set step 400 where the following equation is calculated by CPU on the basis of the in-car temperature T(t) to set a value of $\theta$ corresponding with the actual in-car temperature T(t).

$$\theta = -a \cdot T(t) + b$$

where the characters a and b indicate constants respectively.

When the program proceeds to a subtraction step 500, the computer 12 calculates an equation C=C−1 and thereafter discriminates whether or not the subtracted value C is "0" at a timer discrimination step 600. If the subtracted value C is "0", the computer 12 discriminates as "yes", and the program will proceed to an in-car temperature control routine 700 in which the computer 12 receives an input signal indicative of the actual in-car temperature T(t) and a set signal indicative of a desired in-car temperature Ts respectively from in-car sensor 8 and temperature selector 10 through converter 11. Then, the computer 12 calculates a deviation $\Delta T(t)$ between the actual in-car temperature T(t) and the desired in-car temperature Ts and discriminates the calculated deviation $\Delta T(t)$ in relation to a predetermined value so as to determine a compensation value $\theta$ for controlling the opening angle of blend door 6, as described in detail later. Subsequently, the program will proceed to a timer set step 800 where a timer data is set to define approximately thirty seconds, and in turn, the program will return to the subtraction step 500.

When the computer 12 discriminates as "no" at the timer discrimination step 600, the program proceeds to a blend door control routine 900 in which the computer 12 receives a feedback signal indicative of the opening angle of blend door 6 from door position sensor 9 through converter 11 to control the opening angle of blend door 6 on the basis of the compensation value $\theta$ obtained from the in-car temperature control routine 700. Thus, the computer 12 generates an output signal therefrom to increase or decrease the opening angle of blend door 6 in accordance with the compensation value $\theta$. Subsequently, the program proceeds to another control routine 1000 where various calculations are conducted in a conventional manner to control the blower speed, the position of switch door 2, the operation of a compressor for evaporator 4 and the like, and in turn, the program returns to the subtraction step 500. Thereafter, the calculations from the subtraction step 500 to the timer set step 800 are repetitively conducted at the time interval of thirty seconds, while the calculations from the subtraction step 500 to the control routine 1000 are also repetitively conducted at a frequency of about 100 msec.

Figure 3:
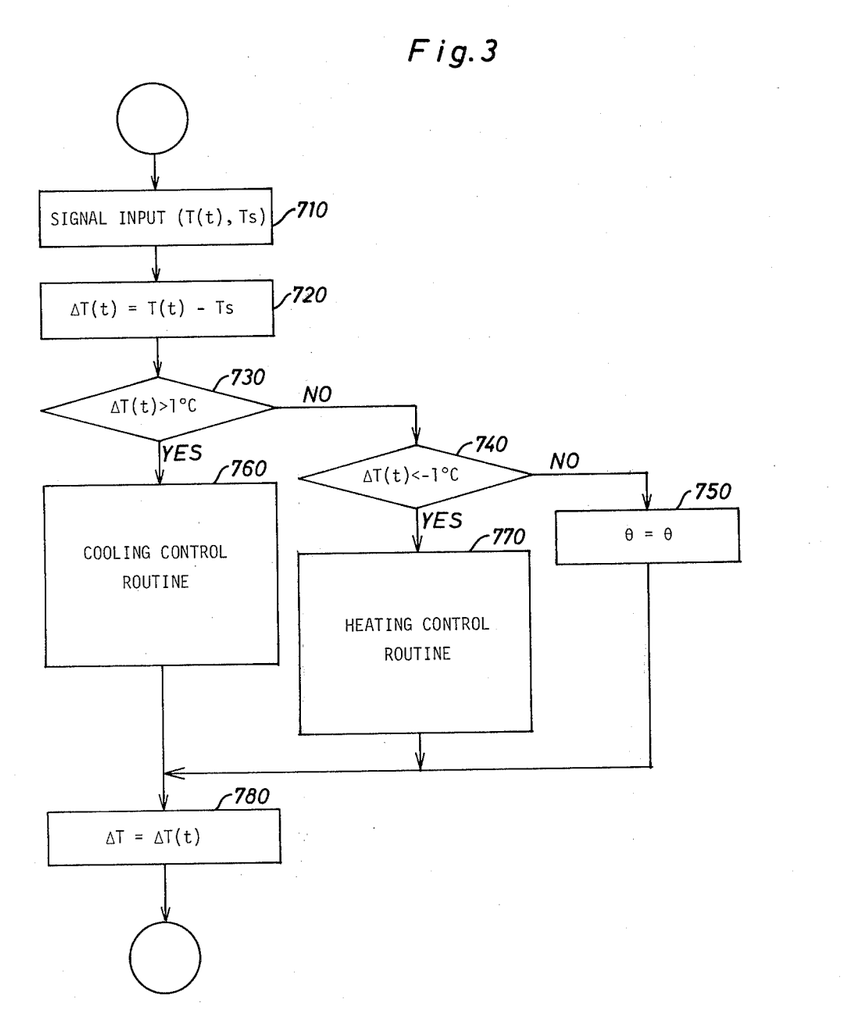
FIG. 3 is a flow diagram illustrative of the calculations under an in-car temperature control routine of FIG. 2.

In FIG. 3 there is illustrated a flow diagram of the in-car temperature control routine 700, in which the program proceeds to an input step 710 when the computer 12 discriminates as "yes" as the timer discrimination step 600. At the input step 710, the computer 12 receives the input signal indicative of the actual in-car temperature T(t) and the set signal indicative of the desired in-car temperature Ts from sensor 8 and temperature selector 10 through converter 11, and subsequently the program proceeds to a deviation calculation step 720 where the computer 12 calculates an equation $\Delta T(t) = T(t) - Ts$ to obtain the deviation $\Delta T(t)$. Then, the program proceeds to a first discrimination step 730 where the computer 12 discriminates whether or not the deviation $\Delta T(t)$ is larger than 1° C. If the deviation $\Delta T(t)$ is larger than 1° C., the computer 12 discriminates as "yes" to proceed the program to a cooling control routine 760. If the deviation $\Delta T(t)$ is smaller than 1° C., the computer 12 discriminates as "no" to proceed the program to a second discrimination step 740. At this step 740, the computer 12 discriminates whether or not the deviation $\Delta T(t)$ is smaller than $-1°$ C. If the deviation $\Delta T(t)$ is smaller than $-1°$ C., the computer 12 discriminates as "yes" to proceed the program to a heating control routine 770. 1 If the deviation $\Delta T(t)$ is larger than $-1°$ C., the computer 12 discriminates as "no" to proceed the program to a holding step 750. At the holding step 750, the computer 12 confirms an equality $\theta = \theta$ to maintain the opening angle of blend door 6 as it is.

When the program proceeds to the cooling control routine 760, the computer 12 executes a calculation to obtain a compensation value in accordance with a value of the deviation $\Delta T(t)$ and variation of the deviation $\Delta T(t)$ at the time interval of thirty seconds. Thus, the computer 12 generates an output signal indicative of the compensation value to control the opening angle of blend door 6 toward the cooling side, as described in detail later. When the program proceeds to the heating control routine 770, the computer 12 executes a calculation to obtain a compensation value in accordance with a value of the deviation $\Delta T(t)$ and variation of the deviation $\Delta T(t)$ at the time interval of thirty seconds. Thus, the computer 12 generates an output signal indicative of the compensation value to control the opening angle of blend door 6 toward the heating side, as described in detail later. After the calculation at one of the above steps, the program proceeds to a renewal step 780 whether the computer 12 substitutes the initial deviation $\Delta T$ with the calculated deviation $\Delta T(t)$ to finish the calculation at the in-car temperature control routine 700.

Figure 4:
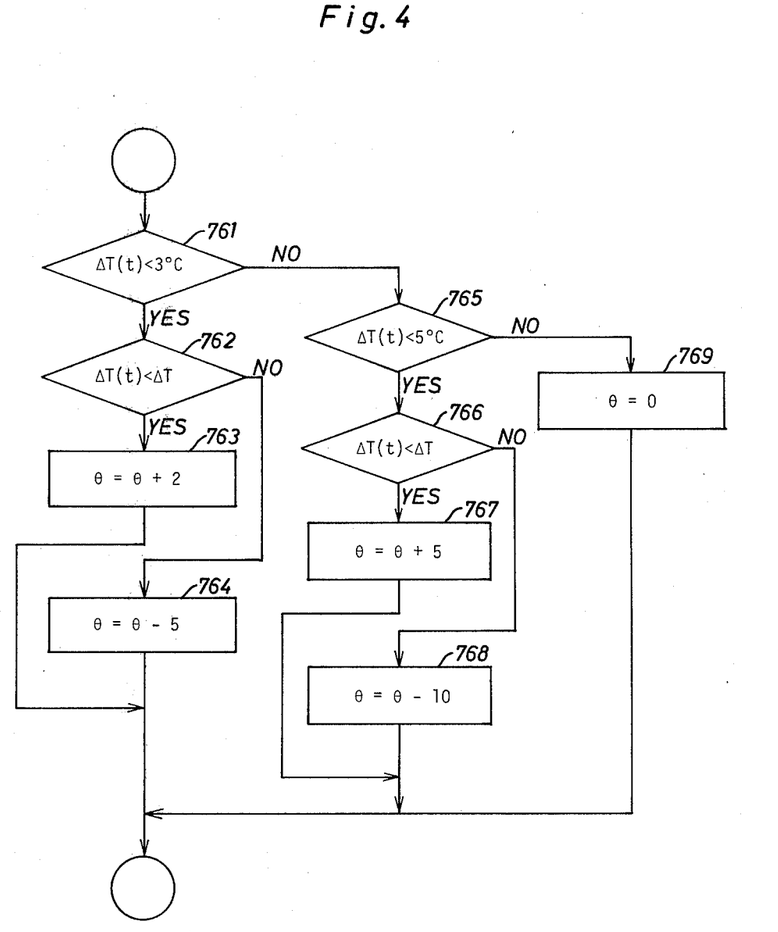
FIG. 4 is a flow diagram illustrative of the calculations under a cooling control routine of FIG. 3.

In FIG. 4 there is illustrated a flow diagram of the cooling control routine 760, in which the program proceeds to a third discrimination step 761 when the computer 12 discriminates as "yes" at the first discrimination step 730. At the step 761, the computer 12 discriminates whether or not the deviation $\Delta T(t)$ is smaller than 3° C. If the deviation $\Delta T(t)$ is smaller than 3° C., the computer 12 discriminates as "yes" to proceed the program to the following discrimination step 762. Then, the computer 12 discriminates whether or not the deviation $\Delta T(t)$ is smaller than the initial deviation $\Delta T$. If the deviation $\Delta T(t)$ is smaller than the initial deviation $\Delta T$, the computer 12 discriminates as "yes" to proceed the program to a first compensation step 763. Then, the computer 12 executes a calculation to substitute a value of $\theta$ with a value of $\theta + 2$ so as to increase the opening angle of blend door 6 by 2% of its full opening angle. If the deviation $\Delta T(t)$ is larger than the initial deviation $\Delta T$, the computer 12 discriminates as "no" to proceed the program to a second compensation step 764. Then, the computer 12 executes a calculation to substitute a value of $\theta$ with a value of $\theta - 5$ so as to decrease the opening angle of blend door 6 by 5% of its full opening angle.

If the deviation $\Delta T(t)$ is larger than 3° C. at the previous step 761, the computer 12 discriminates as "no" to proceed the program to a fourth discrimination step 765. At the step 765, the computer 12 discriminates whether or not the deviation $\Delta T(t)$ is smaller than 5° C. When the deviation $\Delta T(t)$ is smaller than 5° C., the computer 12 discriminates as "yes" to proceed the program to the following discrimination step 766. Then, the computer 12 discriminates whether or not the deviation $\Delta T(t)$ is smaller than the initial deviation $\Delta T$. If the deviation $\Delta T(t)$ is smaller than the initial deviation $\Delta T$, the computer 12 discriminates as "yes" to proceed the program to a third compensation step 767. Thus, the computer 12 executes a calculation to substitute a value of $\theta$ with a value of $\theta + 5$ so as to increase the opening angle $\theta$ of blend door 6 by 5% of its full opening angle. If the deviation $\Delta T(t)$ is larger than the initial deviation $\Delta T$, the computer 12 discriminates as "no" to proceed the program to a fourth compensation step 768. Then, the computer 12 executes a calculation to substitute a value of $\theta$ with a value of $\theta - 10$ so as to decrease the opening angle $\theta$ of blend door 6 by 10% of its full opening angle. In addition, when the computer 12 discriminates "no" at the fourth discrimination step 765, the program proceeds to a maximum cooling step 769 where the computer 12 defines the opening angle $\theta$ of blend door 6 as zero.

Figure 5:
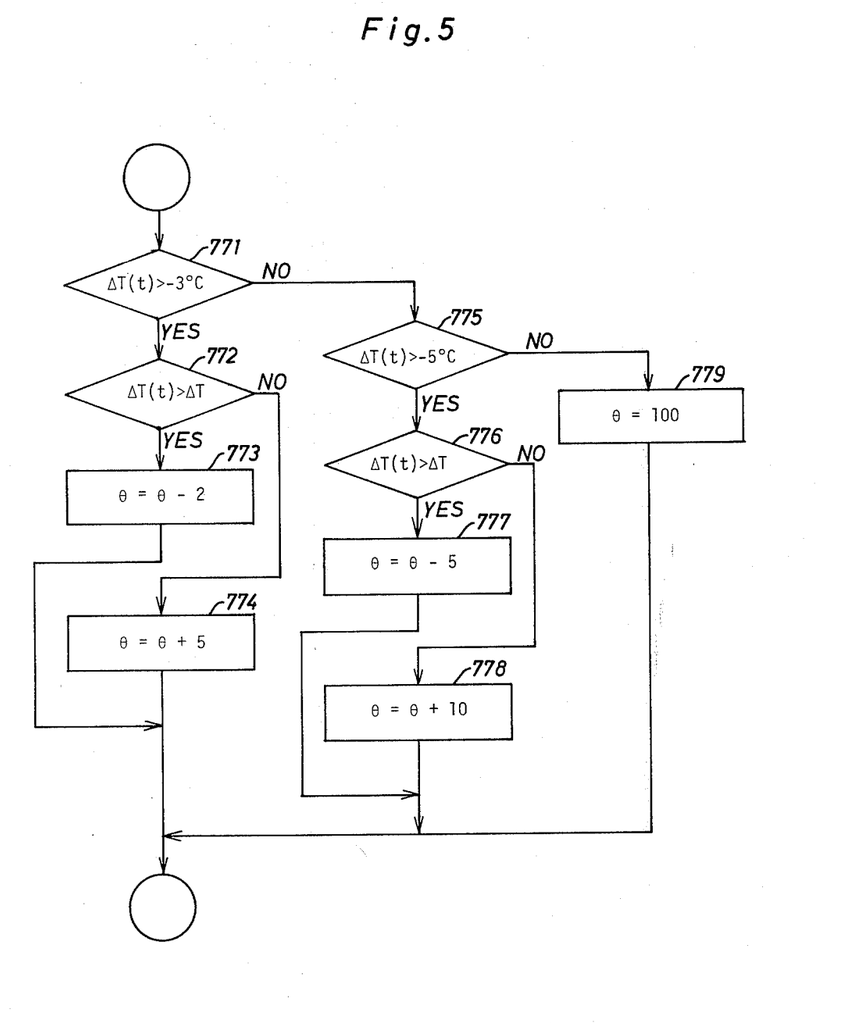
FIG. 5 is a flow diagram illustrative of the calculations under a heating control routine of FIG. 3.

In FIG. 5 there is illustrated a flow diagram of the heating control routine 770, in which the program proceeds to a fifth discrimination step 771 when the computer 12 discriminates as "yes" at the second discrimination step 740. At the step 771, the computer 12 discriminates whether or not the deviation $\Delta T(t)$ is larger than $-3°$ C. If the deviation $\Delta T(t)$ is larger than $-3°$ C., the computer 12 discriminates as "yes" to proceed the program to the following discrimination step 772. Then, the computer 12 discriminates whether or not the deviation $\Delta T(t)$ is larger than the initial deviation $\Delta T$. When the deviation $\Delta T(t)$ is larger than the initial deviation $\Delta T$, the computer 12 discriminates as "yes" to proceed the program to a fifth compensation step 773. Then, the computer 12 executes a calculation to substitute a value of $\theta$ with a value of $\theta - 2$ so as to decrease of the opening angle of blend door 6 by 2% of its full opening angle. When the computer 12 discriminates as "no" at the above step 772, the program proceeds to a sixth compensation step 774 where the computer 12 executes a calculation to substitute a value of $\theta$ with a value of $\theta + 5$ so as to increase the opening angle of blend door 6 by 5% of its full opening angle.

If the computer 12 discriminates as "no" at the fifth discrimination step 771, the program proceeds to a sixth discrimination step 775 where the computer 12 discriminates whether or not the deviation $\Delta T(t)$ is larger than $-5°$ C. When the deviation $\Delta T(t)$ is larger than $-5°$ C., the computer 12 discriminates as "yes" to proceed the program to the following discrimination step 776. Then, the computer 12 discriminates whether or not the deviation $\Delta T(t)$ is larger than the initial deviation $\Delta T$. If the deviation $\Delta T(t)$ is larger than the initial deviation $\Delta T$, the computer 12 discriminates as "yes" to proceed the program to a seventh compensation step 777. Thus, the computer 12 executes a calculation to substitute a value of $\theta$ with a value of $\theta - 5$ so as to decrease the opening angle of blend door 6 by 5% of its full opening angle. If the deviation $\Delta T(t)$ is smaller than the initial deviation $\Delta T$, the computer 12 discriminates as "no" to proceed the program to an eighth compensation step 778. Then, the computer 12 executes a calculation to substitute a value of $\theta$ with a value of $\theta + 10$ so as to increase the opening angle of blend door 6 by 10% of its full opening angle. In addition, when the computer 12 discriminates as "no" at the sixth discrimination step 775, the program proceeds to a maximum heating step 779 where the computer 12 defines the opening angle $\theta$ of blend door 6 as 100%.

Figure 6:
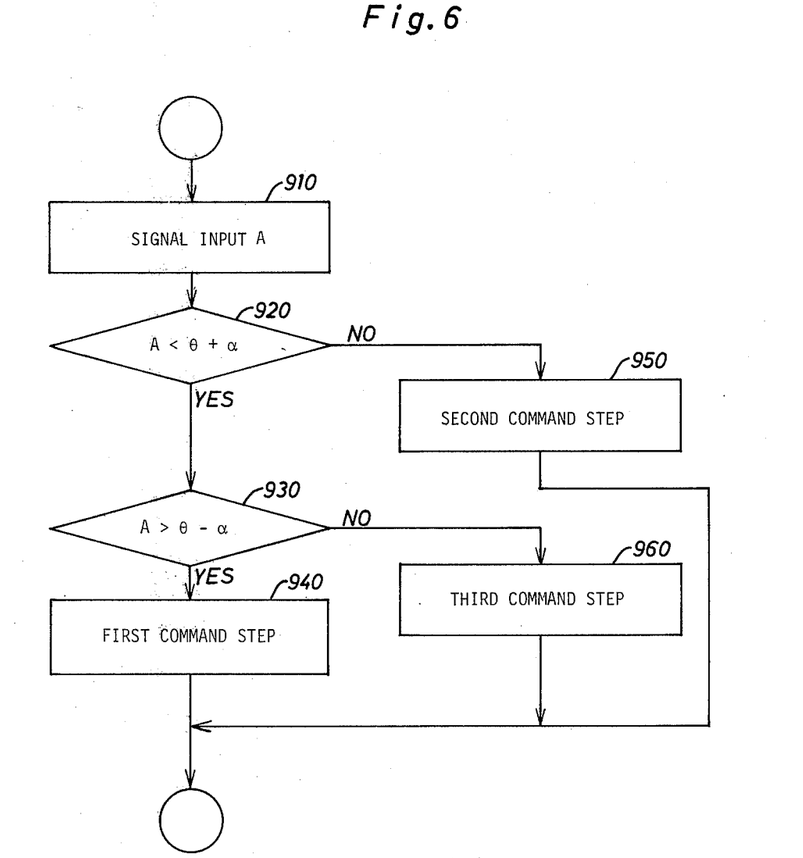
FIG. 6 is a flow diagram illustrative of the calculations under a blend door control routine shown in FIG. 2.

In FIG. 6 there is illustrated a flow diagram of the blend door control routine 900, in which the program proceeds to an input step 910 when the computer 12 discriminates as "no" at the timer discrimination step 600 after setting the timer data C at the step 800. At the input step 910, the computer 12 receives a feedback signal indicative of an actual opening angle A of blend door 6 from door position sensor 9 through converter 11, and the program proceeds to a discrimination step 920 where the computer 12 discriminates whether or not the actual opening angle A is smaller than a value of $\theta + \alpha$ representing an upper limit value of non-sensitive range. If the actual opening angle A is smaller than the value of $\theta + \alpha$, the computer discriminates as "yes" to proceed the program to the following discrimination step 930. Then, the computer 12 discriminates whether or not the actual opening angle A is larger than a value of $\theta - \alpha$ representing a lower limit of a non-sensitive range. When the actual opening angle A is larger than the value of $\theta - \alpha$, the computer 12 discriminates as "yes" to proceed the program to a first command step 940. Thus, the computer 12 generates an output signal therefrom to maintain the opening angle of blend door 6 as it is.

When the computer 12 discriminates as "no" at the above step 920, the program proceeds to a second command step 950 where the computer 12 generates an output signal to decrease the opening angle of blend door 6. If the computer 12 discriminates as "no" at the above step 930, the program proceeds to a third command step 960 where the computer 12 generates an output signal therefrom to increase the opening angle of blend door 6.

From the above description, it will be noted that the respective calculations under the blend door control routine 900 are conducted on the basis of the compensation value $\theta$ determined under the in-car temperature control routine 700 to approach the opening angle of blend door 6 toward the compensation value $\theta$.

Assuming that the automobile air conditioner is operated under the control of the electronic control system in summer, when the program proceeds to the timer discrimination step 600 after subtraction of $C = C - 1 = 1 - 1 = 0$ at the subtraction step 500, the computer 12 discriminates as "yes" to proceed the program to the input step 710 of in-car temperature control routine 700. Then, the computer 12 receives an input signal indicative of an actual in-car temperature T(t) and a set signal indicative of a desired in-car temperature Ts from sensor 8 and temperature selector 10 through converter 11, and subsequently the program proceeds to the deviation calculation step 720 where the computer 12 executes the calculation of $\Delta T(t) = T(t) - Ts$ of which the resultant value $\Delta T(t)$ is apparently larger than 5° C. Accordingly, the computer 12 discriminates as "yes" at the first discrimination step 730 to proceed the program to the third discrimination step 761 of cooling control routine 760, as shown in FIG. 4. Then, the computer 12 discriminates as "no" at the step 761, and the program proceeds to the fourth discrimination step 765 where the computer 12 discriminates as "no". Consequently, the program proceeds to the maximum cooling step 769 where the computer 12 acts to determine the opening angle of blend door 6 as $\theta = 0$, and subsequently the program proceeds to the renewal step 780 to finish the calculations under the cooling control routine 760. At the renewal step 780, the computer 12 substitute the initial deviation $\Delta T$ with the calculated deviation $\Delta T(t)$, and the program proceeds to the timer set step 800 where the time interval of thirty seconds is set.

After the program returns to the subtraction step 500, the computer 12 discriminates as "no" at the timer discrimination step 600 to proceed the program to the input step 910 of blend door control routine 900, as shown in FIG. 6. Then, the computer 12 receives a feedback signal indicative of the actual opening angle of blend door 6 from door position sensor 9 through converter 11, and the program proceeds to the discrimination step 920 where the computer discriminates whether or not the actual opening angle A is smaller than an upper limit value a $\theta + 2$ of non-sensitive range on the basis of $\theta = 0$ determined under the cooling control routine 700. As a result, the computer 12 discriminates as "no", and the program proceeds to the second command step 950 where the computer generates an output signal to decrease the opening angle of blend door 6. Subsequently, the program returns to the subtraction step 500 by way of the control routine 1000. Upon receiving the output signal from computer 12, the driving circuit 14 operates the vacuum actuator 15 to control the opening angle of blend door 6 in a direction of $\theta = 0$.

Thereafter, the calculations under control routines 900 and 1000 are repetitively executed at the frequency of 100 msec in the time interval of thirty seconds. As a result of the repetitive calculations, the opening angle of blend door 6 is controlled in the maximum cooling position to block the cooled air flowing into heater core 5 and to allow only the cooled air directly flowing into the passenger compartment. After the heater core 5 is fully closed by blend door 6, the computer 12 discriminates as "yes" at the respective discrimination steps 920, 930 during the repetitive calculations to proceed the program to the first command step 940. Thus, the computer 12 generates an output signal therefrom to maintain the opening angle of blend door 6 in the maximum cooling position.

When the subtracted value at step 500 is calculated as $C = 0$ after a lapse of thirty seconds, the computer 12 discriminates as "yes" to proceed the program to the in-car temperature control routine 700. At this stage, the in-car temperature hardly changes because of a lapse of only thirty minutes after the start of operation. This results in calculations under the cooling control routine 760 substantially the same as those at the first calculation stage. Subsequently, the computer 12 executes repetitive calculations under the control routines 900 and 1000 in the time interval of thirty seconds and continuously generates output signals to maintain the opening angle of blend door 6 in the maximum cooling position. Thus, the actual in-car temperature decreases toward the desired in-car temperature.

When the deviation $\Delta T(t)$ between the actual in-car temperature and the desired in-car temperature becomes below 5° C. after a lapse of one or two minutes, the calculated deviation value $\Delta T(t)$ at the step 720 of in-car temperature control routine 700 becomes smaller than 5° C. Then, the computer 12 discriminates as "yes" at the fourth discrimination step 765 of cooling control routine 760, as shown in FIG. 4, and the program proceeds to the following discrimination step 766. In this instance, the calculated deviation value $\Delta T(t)$ becomes smaller than the previously calculated value $\Delta T(t)$ due to gradual decrease of the actual in-car temperature toward the desired in-car temperature. Thus, the computer discriminates as "yes" at step 766, and the program proceeds to the third compensation step 767 where the computer 12 executes a calculation to substitute the value of $\theta$ with a value of $\theta + 5$ so as to increase the opening angle of blend door 6 by 5%. Thereafter, the program returns to the subtraction step 500 through the renewal step 780 and the timer set step 800. During repetitive calculations under the control routines 900 and 1000 after the above calculations, the computer generates an output signal to increase the opening angle of blend door 6 by 5%. Upon receiving the instant output signal from computer 12, the driving circuit 14 operates the vacuum actuator 15 to control the opening angle of blend door 6 toward the warming side. Consequently, a portion of cooled air flows into heater core 5, and the heated air is mixed with the remainder of cooled air and flows into the passenger compartment. After increase of the opening angle of blend door 6, the computer 12 discriminates as "yes" at the respective discrimination steps 920, 930 to proceed the program to the first command step 940. Thus, the computer 12 generates output signals to maintain the opening angle of blend door 6 in the increased position.

When the subtracted value at step 500 is further calculated as C=0 after a lapse of thirty seconds, the computer 12 discriminates as "yes" to proceed the program to the in-car temperature control routine 700. Thus, the computer 12 discriminates as "yes" at the fourth discrimination step 765 of FIG. 4 and subsequently discriminates as "yes" at the following discrimination step 766 to proceed the program to the third compensation step 767. Then, the computer 12 executes a calculation to further substitute the previous compensation value with a value of $\theta+5$ thereby to further increase the opening angle of blend door 6 by 5%. Subsequently, the program returns to the subtraction step 500 through the renewal step 780 and the timer set step 800. During repetitive calculations under the control routines 900 and 1000 after the successive calculations described above, the computer generates an output signal to further increase the opening angle of blend door 6 by 5%. The calculations under the in-car temperature control routine 700 are successively executed by the computer 12 at the time interval of thirty seconds until the deviation $\Delta T(t)$ becomes 3° C., and the calculations under the control routines 900 and 1000 are repetitively executed by the computer 12 on the basis of each compensation value determined by the successive calculations.

When the deviation $\Delta T(t)$ between the actual in-car temperature and the desired in-car temperature becomes below 3° C., the computer 12 discriminates as "yes" at the third discrimination step 761 of FIG. 4 to proceed the program to the following discrimination step 762. In this instance, the successive deviation value $\Delta T(t)$ becomes smaller than the previously calculated value $\Delta T$ due to further decrease of the actual in-car temperature toward the desired in-car temperature. Thus, the computer discriminates as "yes" at step 762, and the program proceeds to the first compensation step 763 where the computer 12 executes a calculation to substitute the value of $\theta$ with a value of $\theta+2$ so as to increase the opening angle of blend door 6 by 2%. Thereafter, the program returns to the subtraction step 500 through the renewal step 780 and the timer set step 800. Then, during repetitive calculations under the control routines 900 and 1000, the computer 12 generates an output signal to increase the opening angle of blend door 6 by 2%.

When the deviation $\Delta T(t)$ becomes below 1° C., the computer 12 discriminates as "no" respectively at the first and second discrimination steps 730 and 740 to proceed the program to the holding step 750, as shown in FIG. 3. Thus, the computer 12 confirms an equality $\theta=\theta$ to maintain the opening angle of blend door 6 in the controlled position. From the above description, it will be noted that if the deviation $\Delta T(t)$ is above 5° C. in summer, the opening angle of blend door 6 is first controlled in the maximum cooling position and successively increased by 5% and by 2% in accordance with decrease of the deviation $\Delta T(t)$ to gradually approach the actual in-car temperature T(t) toward the desired in-car temperature Ts.

In addition, if the in-car temperature T(t) does not approach the desired in-car temperature Ts under the deviation of 5° C.<3° C., the computer will discriminate as "no" at step 766 of FIG. 4 to proceed the program to the fourth compensation step 768. As a result, the computer 12 executes a calculation to substitute the value of $\theta$ with a value of $\theta-10$ thereby to decrease the opening angle of blend door by 10%. Furthermore, if the in-car temperature T(t) does not approach the desired in-car temperature Ts under the deviation of 3° C.<1° C., the computer will discriminate as "no" at step 762 of FIG. 4 to proceed the program to the second compensation step 764. As a result, the computer 12 executes a calculation to substitute the value of $\theta$ with a value of $\theta-5$ thereby to decrease the opening angle of blend door 6 by 5%.

When the deviation $\Delta T(t)$ becomes below $-1°$ C. due to excessive decrease of the temperature in the passenger compartment, the computer 12 discriminates as "no" at the first discrimination step 730 in FIG. 3 and discriminates as "yes" at the second discrimination step 740 to proceed the program to the fifth discrimination step 771 of heating control routine 770, as shown in FIG. 5. Then the computer 12 discriminates as "yes" at step 771 and discriminates as "no" at the following step 772 to proceed the program to the sixth compensation step 774. Thus, the computer 12 executes a calculation to substitute the value of $\theta$ with a value of $\theta+5$ thereby to increase the opening angle of blend door 6 by 5% at the time interval of thirty seconds, as described above. When the actual in-car temperature T(t) approaches the desired in-car temperature Ts under the above control, the computer discriminates as "yes" at step 772 to proceed the program to the fifth compensation step 773. As a result, the computer 12 executes a calculation to substitute the value of $\theta$ with a value of $\theta-2$ thereby to decrease the opening angle of blend door 6 by 2% at the time interval of thirty seconds. This serves to maintain the deviation $\Delta T(t)$ between 1° C. and $-1°$ C.

In operation of the electronic control system in winter, the computer discriminates as "no" respectively at the fifth and sixth discrimination steps 771 and 775 of heating control routine 770, as seen in FIG. 5, and the program proceeds to the maximum heating step 779 where the computer acts to determine the opening angle of blend door 6 as $\theta=100$. Thereafter, the calculations under the control routines 900 and 1000 are repetitively executed in the time interval of thirty seconds. As a result of repetitive calculations, the opening angle of blend door 6 is controlled in the maximum heating position to pass all the cooled air through heater core 5, and only the heated air flows into the passenger compartment.

When the deviation $\Delta T(t)$ becomes above $-5°$ C. under the heating control, the computer 12 discriminates as "yes" respectively at the steps 775 and 776 of heating control routine 770 to proceed the program to the seventh compensation step 777. Then, the computer executes a calculation to substitute the value of $\theta$ with a value of $\theta-5$ thereby to decrease the opening angle of blend door 6 by 5% and subsequently generates an output signal to decrease the opening angle of blend door 6 by 5% during the following repetitive calculations under the control routines 900 and 1000. Successively, the calculations under the heating control routine 770 are executed by the computer 12 at the time interval of thirty seconds, and the calculations under the control routines 900 and 1000 are repetitively executed by the computer 12 on the basis of each compensation value determined by the successive calculations.

When the deviation $\Delta T(t)$ becomes above $-3°$ C., the computer discriminates as "yes" respectively at the steps 771 and 772 of heating control routine 770 to proceed the program to the fifth compensation step 773. Then, the computer 12 executes a calculation to substitute the value of $\theta$ with a value of $\theta-2$ and subsequently generates an output signal to decrease the opening angle of blend door 6 by 20% during the following repetitive calculations under the control routines 900 and 1000. The above calculations under the heating control routine 770 are successively executed by the computer 12 at the time interval of thirty seconds, and the calculations under the control routines 900 and 1000 are repetitively executed to gradually decrease the opening angle of blend door 6 in each 2%.

When the deviation $\Delta T(t)$ becomes above $-1°$ C., the computer 12 discriminates as "no" respectively at the first and second discrimination steps 730 and 740 of in-car temperature control routine 700, and the program proceeds to the holding step 750 where the computer 12 confirms an equality $\theta=\theta$ to maintain the opening angle of blend door 6 in the controlled position.

Assuming that a deviation $\Delta T(t)$ at the initial operation stage is approximately $2°$ C. in spring or autumn, the computer discriminates as "yes" at the first discrimination step 730 of in-car temperature control routine 700 to proceed the program to the third discrimination step 761 of cooling control routine 760, as shown in FIG. 4. Then, the computer 12 discriminates as "yes" to proceed the program to the following discrimination step 762. In this instance, the deviation $\Delta T(t)$ is larger than the initial deviation $\Delta T$. This proceeds the program to the second compensation step 764 where the computer 12 executes a calculation to substitute the value of $\theta$ with a value of $\theta-5$ thereby to decrease the opening angle of blend door 6 by 5%. Thereafter, the calculations under the control routines 900 and 1000 are repetitively executed by the computer 12 on the basis of the calculated compensation value, as described above in detail.

From the above detailed descriptions, it will be noted that the deviation $\Delta T(t)$ between the actual in-car temperature T(t) and the desired in-car temperature Ts is periodically calculated to detect such various thermal disturbance as changes of the temperature of outside air, the solar heat, the number of passengers and the like, and that the compensation value of the opening angle of blend door 6 is determined in accordance with periodical variation of the deviation $\Delta T(t)$ to ensure stable control of the in-car temperature.

In actual use of the electronic control system, the time interval for calculations under the in-car temperature control routine 700 and each value defined at the compensation steps may be altered in accordance with each type of automobiles. Furthermore, the initial value of $\theta$ at step 400 may be determined in consideration with the actual in-car temperature and the deviation $\Delta T(t)$. If necessary, the air control by blend door 6 may be replaced, for example, with control by conventional variable cooling and heating devices. It is also noted that the microcomputer 12 may be replaced with appropriate electronic circuits to provide the equivalent operations.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method for controlling an automobile air conditioner in which a control member is provided to adjust the output of said air conditioner from maximum heating to maximum cooling according to its position, the method comprising the steps of:
   generating a first electric signal indicative of the actual in-car temperature, a second electric signal indicative of a desired in-car temperature, and a feedback signal indicative of the position of said control member;
   calculating, in sequence, the deviation between the actual in-car temperature and the desired in-car temperature in response to said first and second electric signals at a predetermined time interval;
   discriminating the previously calculated deviation in relation to the subsequently calculated deviation to detect a tendency of variation of the deviations;
   determining a compensation value related to the calculated deviations in dependence upon the discrimination result of the deviations;
   discriminating a value of said feedback signal in relation to the compensation value to generate an output signal in accordance with the compensation value taking into account the feedback signal value; and
   controlling the position of said control member in response to the output signal to direct the actual in-car temperature towards the desired in-car temperature.

2. A method for controlling an automobile air conditioner as claimed in claim 1, wherein the step of calculating, in sequence, the temperature deviation further includes the following step of;
   performing a first comparison by comparing the calculated deviation with a predetermined value to selectively produce first and second proceeding signals in dependence upon the comparison result; and wherein the step of discriminating the previously calculated deviation with the subsequently calculated deviation is conducted in response to one of said proceeding signals to detect a tendency of variation of the deviations.

3. A method for controlling an automobile air conditioner as claimed in claim 2, wherein the step of comparing the calculated deviation with a predetermined value further includes the steps of:
   performing a second comparison by comparing the calculated deviation with a second predetermined value in response to said second proceeding signal to produce a third proceeding signal in dependence upon the result of said second comparison, and wherein the step of discriminating the feedback signal value includes the step of generating an output signal in response to said third proceeding signal to maintain said control member in its adjusted position.

4. A method for controlling an automobile air conditioner in which a control member is provided to adjust the output of said air conditioner from maximum heating to maximum cooling according to its position, the method comprising the steps of:
   generating a first electric signal indicative of the actual in-car temperature, a second electric signal indicative of a desired in-car temperature, and a feedback signal indicative of the position of said control member;

calculating, in sequence, the deviation between the actual in-car temperature and the desired in-car temperature at a predetermined time interval;

performing a first comparison by comparing the calculated deviation with a first predetermined positive value to selectively produce first and second proceeding signals in dependence upon the first comparison result;

performing a second comparison by comparing the calculated deviation with a first predetermined negative value in response to said second proceeding signal to produce a third proceeding signal in dependence upon the result of said second comparison;

performing a third comparison by comparing the calculated deviation with a second predetermined positive value in response to said first proceeding signal to selectively produce first and second control signals in dependence upon the result of said third comparison and performing a fourth comparison by comparing the calculated deviation with a third predetermined positive value in response to said second control signal to produce a third control signal in dependence upon the result of said fourth comparison;

performing a fifth comparison by comparing the calculated deviation with a second predetermined negative value in response to said second proceeding signal to selectively produce fourth and fifth control signals in dependence upon the result of said fifth comparison and performing a sixth comparison by comparing the calculated deviation with a third predetermined negative value in response to said fifth control signal to produce a sixth control signal in dependence upon the result of said sixth comparison;

discriminating the previously calculated deviation in relation to the subsequently calculated deviation in response to one of said first, second, fourth and fifth control signals to detect a tendency of variation of the deviations;

determining a compensation value in accordance with the discrimination result of the deviations;

comparing a value of said feedback signal with the compensation value to generate a first output signal in accordance with the compensation value taking into account the feedback signal value;

generating second and third output signals respectively in response to said third and sixth control signals; and controlling said control member in response to said first output signal to direct the actual in-car temperature towards the desired in-car temperature, adjusting said control member to its maximum cooling position in response to said second output signal, and adjusting said control member to its maximum heating position in response to said third output signal.

5. An electric control system for an automobile air conditioner in which a control member is provided to adjust the output of said air conditioner from maximum heating to maximum cooling according to its position, comprising:

an in-car temperature sensor exposed to the temperature in a passenger compartment for generating a first electric signal indicative of the actual in-car temperature;

a temperature selector for generating a second electric signal indicative of a desired in-car temperature;

a position sensor responsive to movement of said control member for generating an electric feedback signal indicative of the position of said control member;

first means responsive to said first and second electric signals for calculating, in sequence, the deviation between the actual in-car temperature and the desired in-car temperature at a predetermined time interval and for comparing the calculated deviation with a first predetermined value to selectively produce first and second proceeding signals in dependence upon the comparison result and comparing the calculated deviation with a second predetermined value in response to said second proceeding signal to produce a third proceeding signal in dependence upon the result of said second-named comparison, said first means being responsive to one of said first and second proceeding signals for discriminating the previously calculated deviation in relation to the subsequently calculated deviation to detect a tendency of variation of the deviations and for determining a compensation value in accordance with the discrimination result of the deviations;

second means responsive to said feedback signal for discriminating a value of said feedback signal in relation to the compensation value to generate a first output signal in accordance with the compensation value taking into account the feedback signal value, said second means being further responsive to said third proceeding signal from said first means for generating a second output signal; and an actuator for controlling the position of said control member in response to the first output signal from said second means to direct the actual in-car temperature towards the desired in-car temperature and for maintaining said control member in its adjusted position in response to the second output signal from said second means.

6. An electric control system for an automobile air conditioner in which a control member is provided to adjust the output of said air conditioner from maximum heating to maximum cooling according to its position, comprising:

an in-car temperature sensor exposed to the temperature in a passenger compartment for generating a first electric signal indicative of the actual in-car temperature;

a temperature selector for generating a second electric signal indicative of a desired in-car temperature;

a position sensor responsive to movement of said control member for generating an electric feedback signal indicative of the position of said control member;

a computer programmed to calculate, in sequence, the deviation between the actual in-car temperature and the desired in-car temperature at a predetermined time interval, to perform a first comparison by comparing the calculated deviation with a first predetermined positive value to selectively produce first and second proceeding signals in dependence upon the first comparison result, to perform a second comparison by comparing the calculated deviation with a first predetermined negative value in response to said second proceeding signal to produce a third proceeding signal in dependence upon the result of said second comparison, to perform a third comparison by comparing the calculated deviation with a second predetermined positive value in response to said first proceeding signal to selectively produce first and second control signals in dependence upon the result of said third comparison, to perform a fourth comparison by comparing the calculated deviation with a third predetermined positive value in response to said second control signal to produce a third control signal in dependence upon the result of said fourth comparison, to perform a fifth comparison by comparing the calculated deviation with a second predetermined negative value in response to said second proceeding signal to selectively produce fourth and fifth control signals in dependence upon the result of said fifth comparison, and to perform a sixth comparison by comparing the calculated deviation with a third predetermined negative value in response to said fifth control signal to produce a sixth control signal in dependence upon the result of said sixth comparison; said computer being further programmed to discriminate the previously calculated deviation in relation to the subsequently calculated deviation in response to one of said first, second, fourth, and fifth control signals, to determine a compensation value in accordance with the discrimination result of the deviations, to compare a value of said feedback signal with the compensation value to generate a first output signal in accordance with the compensation value taking into account the feedback signal value and to generate second and third output signals respectively in response to said third and sixth control signals; and an actuator for controlling the position of said control member in response to the first output signal from said computer to direct the actual in-car temperature towards the desired in-car temperature, for adjusting said control member to its maximum cooling position in response to the second output signal from said computer, and for adjusting said control member to its maximum heating position in response to the third output signal from said computer.

* * * * *